March 25, 1969  I. BENDER  3,434,900
METHOD FOR MAKING BONDED PIPE JOINTS
Filed Jan. 7, 1966
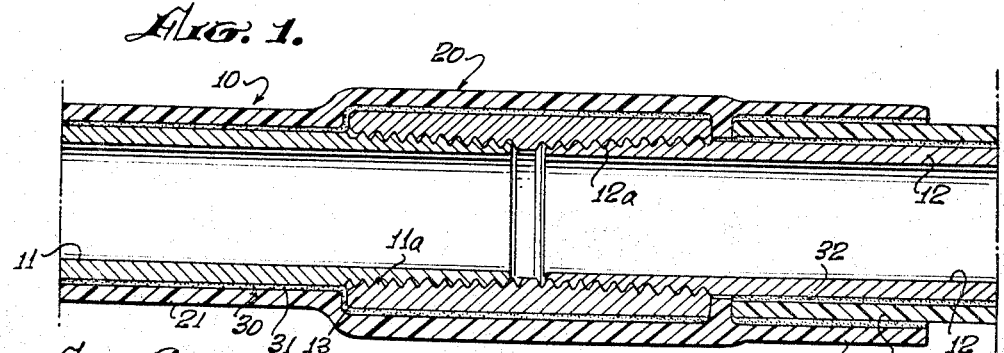
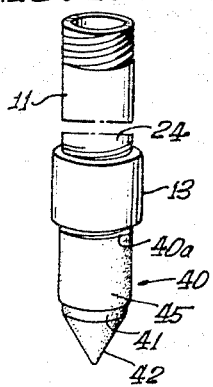
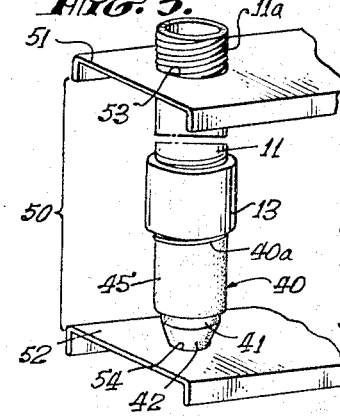
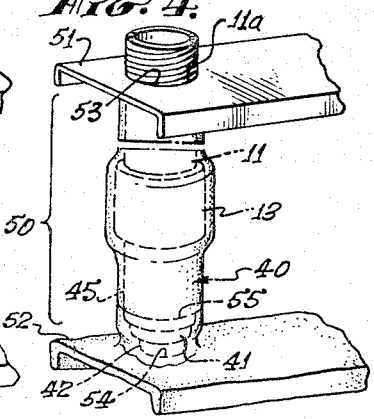
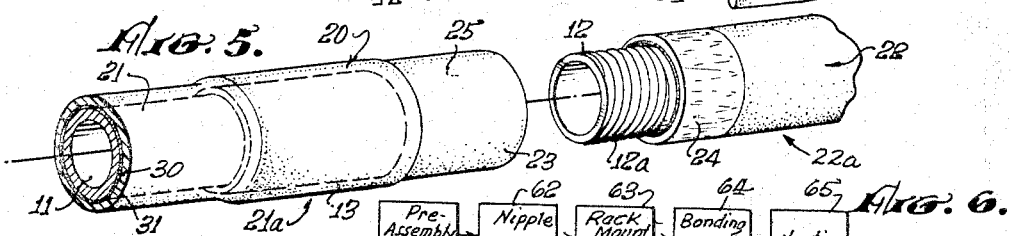
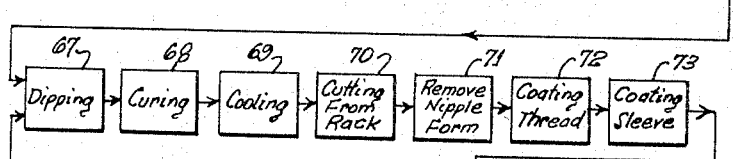
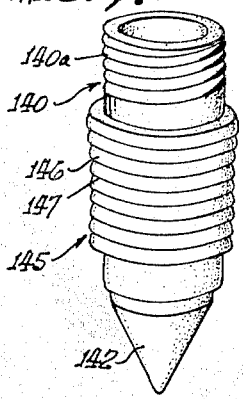
INVENTOR.
ILAN BENDER,
By Edmond F. Shanahan
ATTORNEY.

United States Patent Office 3,434,900
Patented Mar. 25, 1969

3,434,900
METHOD FOR MAKING BONDED PIPE JOINTS
Ilan Bender, 17220 Collins St.,
Encino, Calif. 91316
Filed Jan. 7, 1966, Ser. No. 519,273
Int. Cl. B32b 1/08; F16l 9/14, 47/02
U.S. Cl. 156—182                6 Claims

ABSTRACT OF THE DISCLOSURE

A method for producing assemblies of threaded pipe and coupling with the entire assembly enclosed in a continuous plastic jacket bonded to its exterior surface, which method consists of first forming subassemblies with plastic jacketing bonded by epoxy coating to the pipe and coupling surfaces, but with exposed exterior threaded connections, and empty plastic sleeve extensions at interior threaded connections; then assembling the subassemblies into the final assembly, with plastic sleeve extensions overlapping plastic coated pipe at each connection; and then solvent welding plastic to plastic at each of said sleeve-enclosed connections.

---

This invention relates generally to a method for making an assembly of threaded metal pipe and metal coupling means with a plastic sleeve covering continuously bonded to said assembly, and more particularly to such a method in which sub-assemblies of pipe and coupling are first enclosed in a sleeve bonded to the sub-assembly, but provided with an empty plastic extension sleeve by means of a sleeve form, and then assembling several of said sub-assemblies into the final assembly, accompanied by plastic bonding of sleeve to sleeve to produce a hermetic and continuously bonded sleeve enclosure for the entire threaded pipe assembly.

In electrical wiring construction, the preferred specifications for underground wiring require that the wires be inside a conduit system comprised of heavy threaded pipe and threaded coupling means; and that the entire threaded pipe assembly be wrapped in a hermetic wrapping of insulating material which is also resistant to corrosion, water penetration, and other sources of deterioration in underground pipe systems. It will be understood that the term "coupling means" is used throughout this application to include all internally threaded means used for connecting a threaded pipe assembly, not only the common straight coupling, but also any T's, boxes, etc. Almost all installations which are covered by the preferred industry's standards, or by the laws of governmental bodies, are presently made by applying an asphalt and fabric wrappings to the entire threaded assembly of pipes and couplings.

The asphalt-wrapped pipe assembly has proven to be extremely expensive in construction cost. In spite of pre-wrapping of the pipe at the factory, the labor cost of asphalt wrapping the final assembly couplings at the construction site may exceed all the labor and material costs of the pipe assembly up to the point of wrapping.

Moreover, there are available plastic materials for providing sleeve enclosure for the entire threaded pipe assembly, which sleeve enclosure is superior in most instances to asphalt wrappings. Some plastic materials exhibit better insulating qualities, more resistance to corrosion and more reliability against unseen defects in construction. Although it is conceivable that various types of thermosetting plastic might be used for such a purpose, poly-vinyl chloride is by far the best resin for the practice of the present invention. Combined with suitable plasticisers, stabilisers, and coloring material, it is much preferred as the plastic which best accommodates to the steps of the novel process of the invention. Unfortunately, poly-vinyl chloride does not bond adequately to the surface of some of the metal pipes and couplings used in underground threaded conduit assemblies. Consequently, the invention in its preferred form calls for the use of a second plastic material, a suitable epoxy liquid, of which there are many, for producing a good bond between the metal surface and the poly-vinyl chloride or other plastic used in the sleeve.

Ordinarily, the contractural specifications or governmental construction code require that steel pipe and couplings be used, that pipe and couplings be galvanized, and that the final sleeve wrapping be bonded continuously and completely over all parts of the system. It is to be noted in this connection that it is sometimes necessary to bend a pre-coated pipe at the construction site; it is therefore necessary that any pre-coating employed be so tightly bonded to the galvanized pipe surface that some substantial degree of bending and forming the pre-coated pipe can be conducted at the construction site without producing a separation of surface bonding.

It will be understood that the threaded pipe assemblies, enclosed in insulating and corrosion-resistant sleeves, as produced by the method of the present invention, will find utility in applications other than underground electrical wiring. Wherever a threaded pipe assembly must be protected from corrosive attack, or insulated from electrolysis or other unwanted electrical contact, such assemblies are useful. For example, the invention may find application in piping for fluids through an environment of sea water, or in a corrosive chemical atmosphere, or the like.

It is a major object of the present invention to provide a method for the purposes above described in which not only the pipe but also the coupling means are partially preassembled, and pre-enclosed with a suitable insulating sleeve.

It is a second important object of the invention to provide a construction method in which hermetic sealing of one pre-enclosed sub-assembly to another may be accomplished quickly and easily at the construction site.

It is a still further object of the invention to provide a sleeve and bond construction sufficiently tough to retain complete bonding and sleeve integrity after undergoing normal construction handling and a reasonable degree of bending formation without the development of defects.

The foregoing and other objects and advantages of the invention are accomplished by a method which is carried out in part while fabricating sub-assemblies at a factory, and in part in erecting the final assembly at the construction site. At the factory, a pipe and coupling sub-assembly is temporarily coupled with a sleeve extension form during the bonding and sleeve forming process, to produce a plastic sleeve extension which facilitates the bonding of one sleeve section to another in the field.

Throughout the description herein, a distinction is made between the term "coating" and "sleeve"; the former term is reserved for the bonding coating of epoxy, which is typically only one to ten mils in thickness, whereas the term "sleeve" is reserved for the outer covering of poly-vinyl chloride, or equivalent plastic, which is applied in a thickness at least twice that of the epoxy bonding coating. Ordinarily the poly-vinyl chloride sleeve is about one-thirty-second (1/32) of an inch thick, but the process provides a means for controlling the thickness to almost any practical or desirable limit, by proper selection of dipping temperature and dipping time.

The method of the invention will be best understood by reading the following description of a preferred form of the invention, while referring to the accompanying drawings, in which:

FIGURE 1 is longitudinal sectional view, in approximately full scale, of one coupling location in a pipe assembly produced by the process of the present invention;

FIGURE 2 is a perspective view of a sub-assembly of bare pipe, bare coupling, and form employed for forming a plastic sleeve extension during fabrication; the central part of the pipe in the illustration has been broken away for purposes of compact illustration;

FIGURE 3 illustrates the assembly of FIGURE 2 as it appears mounted vertically in a preferred form of rack for carrying out the dipping steps of the process;

FIGURE 4 is a perspective view similar to FIGURE 3, but showing the pipe sub-assembly and rack subsequent to the bonding and sleeve-forming process;

FIGURE 5 is a perspective view of adjacent ends of first and second pipe and coupling sub-assemblies, enclosed in bonded sleeves, just prior to final assembly;

FIGURE 6 is a block diagram of the process, showing the steps employed in the preferred embodiment of the invention here described; and FIGURE 7 is an alternative form of the sleeve-extension form employed in the process.

The longitudinal sectional view of FIGURE 1 shows the finished product produced by the process, but only by a representation of one coupling location, shown in its simplest form. The entire completed threaded pipe assembly, complete with continuous sleeve and bonding, is identified generally by the numeral 10. Actually, only the adjacent ends of two threaded pipes 11 and 12 are seen, together with a simple coupling 13, all being shown in longitudinal section. Typically, the pipes 11 and 12 and the coupling 13 are galvanized steel.

A continuous plastic sleeve enclosure indicated generally by the numeral 20 is seen to be comprised of a first sleeve 21 on first pipe 11, and a second sleeve 22 on second pipe 12. First sleeve 21 has a sleeve extension 23 which overlays a covered section 24 of second sleeve 22. However, first sleeve 21 and second sleeve 22 are hermetically bonded to one another as indicated at 25. Although any suitable adhesive for the particular plastic materials may be employed, it is much preferred to produce this bond by solvent welding of the adjacent sleeve surfaces. In the case of poly-vinyl chloride sleeves, a suitable solvent, containing some poly-vinyl chloride material, will cause the contacting surfaces of sleeves 21 and 22 to soften and then, by drying, to bond to one another to form continuous poly-vinyl chloride bond.

Secure bonding of the plastic sleeve 20 to the pipes 11 and 12, and the coupling 13, is required, and is achieved by an intermediate layer of epoxy coating, indicated generally by the numeral 30, and comprised of a coating 31 on first pipe 11 and coupling 13, and a second coating 32 on second pipe 12.

It will be appreciated that the threads of the assembly are carefully preserved from being coated, and that assembly must be accomplished to the specified degree of tightness and effective sealing, between threaded surfaces, without damaging sleeve 20 or the bond coating 30.

FIGURES 2, 3, and 4 are perspective views of a single first sub-assembly at various stages of that part of the process which is carried out in the factory. The preferred and most practical method of carrying out the factory steps is my transport of the pipe and coupling sub-assembly in a vertical position, as illustrated, in a suitable rack, for either batch or continuous conveyor operation; all of the illustrations FIGURES 2, 3, and 4 show the first pipe assembly in a vertical position, with a pre-assembled coupling at the lower end, and upper threads exposed and protected from the application of the bonding coating and the plastic sleeve.

In FIGURE 2 the first pipe 11 is shown assembled with coupling 13 and a form 40. It will be appreciated that the preassembly of coupling 13 to pipe 11 is a final and permanent assembly. Consequently, the mating threads of pipe 11 and coupling 13 have been pre-coated with suitable threading compound, as required for the particular job; preferably, an automatic torque wrench has been used to tighten coupling 13 onto pipe 11 to a specification tightness; and, if desired, the assembly has been subjected to some type of sealing test, such as by the application of an internal gas pressure, and inspection of the threaded joint.

Form 40 is in the form of a nipple, with mating threads 40a mating with coupling 13. However, form 40 is plugged tightly closed at the lower end with a plug 41, which is preferably in the form of a downwardly pointed cone 42 for mounting in a dipping rack and removal subsequent to dipping.

As seen in the perspective view of FIGURE 3, upper and lower bars 51 and 52, respectively, indicate a dipping rack 50 which is illustrated only fragmentarily, but which will be understood to be continued in any simple and suitable frame construction for providing many multiples of the mounting illustrated in FIGURE 3.

The first sub-assembly of pipe 11, coupling 13, and form 40, is shown mounted vertically in rack 50, with the conical point 42 in a lower rack hole 54, and the exposed pipe threads 11a projecting through an upper rack hole 53.

As will be explained hereinafter, the coating and sleeve-forming processes are conducted by dipping the rack 50 only up to the level of upper rack bar 51. The result is illustrated in FIGURE 4. The threads 11a are seen to be as bare of coating and sleeve as they were in FIGURE 2. However, the entire remainder of the assembly of pipe 11, coupling 13, and form 40, as well as adjacent parts of the rack 50 have been tightly sealed into a unit which must be partly cut away, for example at the line indicated at 55 in FIGURE 4, in order to permit the completed first assembly to be disassembled from the rack 50.

It is an important feature of the process that the form 40 is entirely coated with, or otherwise surfaced by a material which rejects bonding with either the bonding coating or the sleeve-forming material. A preferred material for this purpose is a suitable fluoro-carbon plastic such as those sold commercially under the trademarks "Teflon" or "Kel-F." The Teflon, or other coated surface of the nipple 40 is indicated in FIGURES 2 and 3 by the numeral 45. By virtue of coating 45, it is a simple matter, after removal of the completed first assembly of FIGURE 4 from the rack 50, to remove form 40, leaving an empty plastic sleeve 25 extending from the coupling 13.

The perspective view of FIGURE 5 shows the adjacent ends of two factory-made sub-assemblies 21a and 22a, just prior to their assembly to one another to produce the completed product already illustrated in the sectional view of FIGURE 1. A pipe threading compound, as specified by the assembly process, has been applied to the exposed threads 12a. The adjacent section 24 of sleeve 22a has been coated with a suitable poly-vinyl chloride solvent, which is fresh and moist.

Assembly 22a is inserted into sleeve 25 and pipe 12 is threaded into pipe 11. Suitable torque, as required by the particular electrical code or building specification, may be applied to the assembly 22a and the assembly 21a without damaging their respective sleeves 22 and 21, if wrenches with suitably padded jaws are employed. Preferably, the jaws of said wrenches should have an extended surface to distribute wrench pressure on the resilient cushioning of the plastic sleeves 21 and 22. In the exceptional instance in which wrenching damages one of the sleeves 21 or 22, or causes it to become unbonded, it is a relatively simple matter to make a repair at the construction site. Poly-vinyl chloride patch material may be sealed over the damaged area with the same solvent which was employed over the sleeve-bonding area 24. Rebounding with a suitable epoxy solution may also be accomplished if it is necessary.

Of course, it will be understood that the final threaded coupling must be completed promptly after the application of the bonding solvent to the surface 24. For a short period of time immediately following the application of this solvent, the adjacent surfaces of sleeves 21 and 22 will slip relative to one another to permit adequate wrenching. However, shortly after this has been completed, the evaporation of the solvent and the co-mingling of adjacent dissolved plastic material produces a bonding of sleeve 21 to sleeve 22 which cannot be disturbed without damaging the entire local sleeve system.

FIGURE 6 is a box diagram of the process, as embodied in the preferred form illustrated and described. Beginning with the block 61, the pre-assembly of a first pipe sub-assembly as illustrated in FIGURE 2 is made, the nipple form 40 being added in the step indicated by block 62.

Block 63 is the step of racking the first pipe assemblies, (each with its form 40), in a vertical position in a rack with the bare threads up, as illustrated in FIGURE 3.

In a typical batch process, the entire rack is next dipped into a tank of liquid epoxy material, which may or may not be heated, depending on the epoxy selected, to cover the entire asembly with a bonding coating (block 64).

Block 65 indicates the transfer of the rack of coated first pipe assemblies through a furnace to heat the entire assembly to a temperature of between about 200 and 400 degrees Fahrenheit. Preferably, the temperature is in the range of about 250 degrees Fahrenheit, in order to both slightly soften the epoxy coating and to provide sufficient heat stored in the pipe assembly to produce the desired sleeve thickness. It will be understood, however, that exact temperatures must be selected by preliminary tests; said sleeve thickness cannot be controlled entirely by the time of dipping in the sleeve-forming plastic material, during the next step of the process. Hotter temperatures may be required for thicker sleeves or for pipe assemblies which have less heat storage capacity because of their small size, or because of the low specific heat of the metal of which they are made.

Freshly prepared poly-vinyl chloride liquid, indicated by block 66, is provided in a tank in which the step of dipping the heated first pipe assemblies is accomplished (block 67). It will be understood that this dipping requires only a few seconds, depending on coating thickness. In addition, it must be realized that some coating thickness may continue to be built up after the rack 50 has been removed from the bath, while excess liquid plastic drains off. Preliminary testing will be required to establish the dipping time an drainage effects before mass production standards are specified for a particular job.

After the rack 50 and its hot, newly formed sleeve covering has been lifted from the tank of step 67, it will have the appearance of FIGURE 4. The rack 50, supporting its pipe assemblies, is placed in a curing furnace (block 68) and the sleeve 20 is cured at a suitable curing temperature, typically about 350 degrees or somewhere in the range of 250 to 400 degrees Fahrenheit for polyvinyl chloride and most suitable plastic sleeve materials.

From the furnace, the rack 50 is dipped in a tank of cooling water (block 69) and, after removal therefrom, each of the pipe assemblies is cut from the rack (block 70), the nipple form 40 is removed (block 71), and the factory portion of the method of the invention is completed.

At the construction site, the threading compound required for the particular job is applied, as indicated by block 72, and the sleeve section 24 is coated with solvent or other suitable material, as indicated by the block 73. Thereupon, the first pipe assembly 21a is immediately assembled with the second pipe assembly 22a, as indicated in FIGURE 5 and in FIGURE 6 by the block 74.

It will be appreciated that the foregoing description of one specific embodiment does not comprehend all the various forms of the invention. On the contrary, many modifications, simplifications, improvements, and variations of the process are possible without departing from the scope of the invention, which is defined by the terms of the claims attached hereto.

For example, FIGURE 7 shows a more elaborate version of form 40, which version is designated as 140 in FIGURE 7. The nipple form 140 has a threaded end 140a, a pointed end 142, and a suitable releasing coating of Teflon plastic or the like, 145, exactly the same as in the case of the simple form 40. However, form 140 is provided along its sleeve-forming length with a series of annular, alternate grooves and ridges 146 and 147. These form reverse image grooves and ridges on the interior surface of the sleeve extension 45. In some applications, such a construction may provide better sleeve-to-sleeve bonding. It will be noted from FIGURE 7 that the paritcular ridges 147 are in the form of diverging cones so as to produce a series of annular teeth inside of sleeve 25, which resist disassembly. Another feature of the form 140 is that the diameter of the sleeve-forming section comprised of grooves 146 and ridges 147 is enlarged so that sleeve 25 does not need to be stretched in order to overlap sleeve 22.

The variations mentioned are merely exemplary of the many variations possible within the scope of the following claims:

What is claimed is:
1. A method for making an assembly of threaded metal pipe and metal coupling means with a plastic sleeve covering continuously bonded to the exterior of said assembly, which method comprises the steps of:
    assembling a first pipe and coupling means in coupled assembly with a mating threaded form, said form being shaped to form a sleeve extension from said coupling, and said form having a surface releasable from plastic deposited thereon;
    bonding to said first pipe assembly, except for the exposed threads of said first pipe, an epoxy coating which softens at a temperature in the range of the thermoplastic temperature for the plastic material of said sleeve;
    heating the threaded assembly to a temperature in said range to soften said epoxy coating sufficiently to produce effective bonding between said coating and said plastic sleeve materials;
    dipping said heated, coated assembly, except for said exposed pipe threads, in a liquid bath of said thermoplastic sleeve material, and withdrawing said assembly from said bath and draining off excess liquid after the lapse of a period of time predetermined as sufficient for the deposition of a sleeve of the desired thickness on said first pipe assembly;
    curing said assembly in an oven at suitable curing temperatures for a suitable curing time;
    removing said form from said first pipe assembly and from a plastic sleeve extension deposited on said form, to produce a first pipe assembly with an empty plastic sleeve extending from said coupling;
    preparing a second pipe assembly with a bonded sleeve in the same manner as the first pipe assembly, and applying solvent welding material to a sleeve bonding area of the exterior surface of the sleeve of said second pipe assembly, adjacent to the exposed threads thereof, said coated area corresponding to the interior of said sleeve extension on said first pipe assembly; and
    assembling said second pipe assembly to said first pipe assembly by threading said second exposed thread to said coupling of said first pipe assembly to bring the interior surface of said sleeve into bonding contact with the coated exterior surface of said second pipe assembly sleeve.

2. A method as described in claim 1, in which:
the thermoplastic sleeve material employed is polyvinyl chloride.

3. A method as described in claim 1, in which:
said first pipe assembly is heated, prior to dipping in the sleeve-forming material, to a temperature in the range of 200 to 400 degrees Fahrenheit, at which the assembly contains sufficient stored heat to produce a sleeve of greater thickness than is required, and then withdrawing the assembly from the sleeve-forming dipping step at a pre-determined time to produce a sleeve of the desired thickness.

4. A method as described in claim 1, in which:
the form employed for forming the sleeve extension from said coupling is coated with a fluoro-carbon plastic material to facilitate release of said form from said sleeve extension.

5. A method as described in claim 1, in which:
the external surface of the sleeve-extension forming form is shaped as a mold to produce on the interior of the sleeve extension bond-facilitating protuberances.

6. A method as described in claim 1, in which:
said steps of forming said bonded sleeve on said first pipe and coupling means are carried out with first pipe and coupling means disposed vertically in a rack with the exposed threads of said pipe in the uppermost position, and said form shaped to function at its lower end as a locating means in said rack.

References Cited

UNITED STATES PATENTS

| | | | |
|---|---|---|---|
| 3,389,046 | 6/1968 | Burress | 156—294 X |
| 2,458,032 | 1/1949 | Simon et al. | 156—98 |
| 2,786,264 | 3/1957 | Colombo | 29—460 X |
| 3,101,207 | 8/1963 | Pavel et al. | 285—291 |
| 3,291,670 | 12/1966 | Usab | 156—245 |
| 3,315,380 | 4/1967 | Mack et al. | 36—19.5 |

OTHER REFERENCES

B. F. Goodrich, catalogue, section 9010, Koroseal Lined Tanks, issued December 1963, 1 sheet in Class 61, vinyl resin digest.

B. F. Goodrich Catalogue, section 10050, Rigid Koroseal Pipe Fittings and Valves, issued May 1958, 8 pages in Class 161, vinyl resin digest.

B. F. Goodrich, catalogue, section 10051, Rigid Koroseal Electrical Conduit, issued August 1959, 6 pages in Class 161, solvent and plasticizer digest.

HAROLD ANSHER, *Primary Examiner.*

U.S. Cl. X.R.

156—294, 304, 289, 308; 29—456, 460, 469